US007857122B2

(12) United States Patent
Williams et al.

(10) Patent No.: US 7,857,122 B2
(45) Date of Patent: Dec. 28, 2010

(54) FLEXIBLE VACUUM CONVEYANCE/MANIFOLD SYSTEM

(75) Inventors: Daniel J. Williams, Woodbury, CT (US); Russell W. Holbrook, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 115 days.

(21) Appl. No.: 12/380,711

(22) Filed: Mar. 2, 2009

(65) Prior Publication Data

US 2010/0219046 A1 Sep. 2, 2010

(51) Int. Cl.
*B65G 13/02* (2006.01)

(52) U.S. Cl. ..................... 198/689.1; 198/817; 271/276

(58) Field of Classification Search .............. 198/689.1, 198/817, 860.1, 861.1; 271/2, 197, 276
See application file for complete search history.

(56) References Cited

U.S. PATENT DOCUMENTS 3,889,801 A * 6/1975 Boyer ...................... 198/689.1
4,480,742 A * 11/1984 Muylle .................... 198/689.1
5,133,543 A * 7/1992 Eitel et al. .................. 271/276
5,548,388 A * 8/1996 Schieck ...................... 271/197
6,216,848 B1 * 4/2001 Zens ....................... 198/689.1
6,481,565 B1 * 11/2002 Sherwood ................ 198/689.1
7,600,755 B1 * 10/2009 Rozenfeld et al. ........... 271/276
2005/0217980 A1 * 10/2005 Ripley ..................... 198/689.1

* cited by examiner

*Primary Examiner*—James R Bidwell
(74) *Attorney, Agent, or Firm*—Brian A. Collins; Angelo N. Chacles

(57) ABSTRACT

A vacuum conveyance/manifold system is provided for processing mailpieces. The vacuum conveyance/manifold system includes at least one conveyor belt and a compliant deck disposed beneath and supporting an underside surface of the conveyor belt. The conveyor belt has rows of aligned apertures disposed therein and a drive surface for engaging a face surface of each of the mailpieces. The compliant deck defines a neutral axis in bending and has a high elongation, low modulus material in a portion of the deck which is distal from the bending neutral axis, and a high yield strength, high modulus material in a portion of the deck which lies coincident with the bending neutral axis. Furthermore, the compliant deck has a plurality of elongate slots formed in the high elongation, low modulus material, which elongate slots are aligned, and in fluid communication, with the rows of apertures in the conveyor belt. A flexible manifold system, having a plurality of flexible tubes, is in fluid communication with the elongate slots of the compliant deck and the vacuum source for developing a pressure differential across each of the mailpieces when in contact with the drive surface of the conveyor belt.

18 Claims, 12 Drawing Sheets

FLEXIBLE VACUUM CONVEYANCE/MANIFOLD SYSTEM

TECHNICAL FIELD

The present invention relates to a system and method for processing mailpieces and more particularly, to a new and useful flexible vacuum conveyance/manifold system for use in combination with a compliant conveyance system.

BACKGROUND OF THE INVENTION

Mailpiece creation systems such as mailpiece inserters are typically used by organizations such as banks, insurance companies, and utility companies to periodically produce a large volume of mailpieces, e.g., monthly billing or shareholders income/dividend statements. In many respects, mailpiece inserters are analogous to automated assembly equipment inasmuch as sheets, inserts and envelopes are conveyed along a feed path and assembled in or at various modules of the mailpiece inserter. That is, the various modules work cooperatively to process the sheets until a finished mailpiece is produced.

A mailpiece inserter includes a variety of apparatus/modules for conveying and processing sheet material along the feed path. Commonly mailpiece inserters include apparatus/modules for (i) feeding and singulating printed content material in a "feeder module", (ii) accumulating the content material to form a multi-sheet collation in an "accumulator", (iii) folding the content material to produce a variety of fold configurations such as a C-fold, Z-fold, bi-fold and gate fold, in a "folder", (iv) feeding mailpiece inserts such as coupons, brochures, and pamphlets, in combination with the content material, in a "chassis module" (v) inserting the folded/unfolded and/or nested content material into an envelope in an "envelope inserter", (vi) sealing the filled envelope in "sealing module" (vii) printing recipient/return addresses and/or postage indicia on the face of the mailpiece envelope at a "print station" and (viii) controlling the flow and speed of the content material at various locations along the feed path of the mailpiece inserter by a series of "buffer stations". In addition to these commonly employed apparatus/modules, mailpiece inserter may also include other modules for (i) binding/to close the module to close and seal filled mailpiece envelopes and a (vi) a printing module for addressing and/or printing postage indicia.

With respect to the printing module, it is common to register a face surface of each mailpiece with a registration plate such that an array of print heads may print information such as destination and return addresses on the face of each mailpiece. More specifically, the registration plate includes an aperture for accepting a stepped array of print head nozzles. The thickness of the registration plate provides a threshold "stand-off" dimension from the face surface of each mailpiece to each of the print head nozzles such that ink droplets may be precisely deposited.

Furthermore, the array of print heads and registration plate are typically disposed over, and in opposed relation to, and underlying conveyance system such as one or more conveyor belts. Mailpieces are conveyed along the belt(s), move under the registration plate and passed by the print head nozzles as ink is deposited. To ensure that mailpieces slide smoothly beneath the registration plate, i.e., without jamming, the spacing between the underlying conveyance system, e.g., the conveyance belt (s), and the registration plate must be closely controlled. That is, with each mail run/print job performed by the print module, the necessary clearance gap must be established based upon the anticipated thickness of mailpieces being processed. As such, print head modules and underlying conveyance systems are typically limited to processing mailpieces having a constant, i.e., non-variable, thickness dimension. While such print head modules are capable of printing on thin and thick mailpieces, they are unable to print consecutive thin and thick mailpieces inasmuch as the clearance gap differs for each of the mailpieces.

Commonly, the mailpieces are conveyed along a feed path to the print heads by a vacuum conveyance/manifold system. The vacuum conveyance/manifold system develops a pressure differential across each of the mailpieces to urge each mailpiece into frictional engagement with one or more conveyor belts. A fluid communication path is created from the drive surface of the conveyor belts to a vacuum source by a combination of apertures, conduits and plenums. More specifically, rows of apertures are typically formed in the belts which communicate with a combination of elongate slots and circular apertures formed in the underlying support deck. Conventionally, a system of plenums are disposed beneath, and attached to an underside surface of, the support deck to draw air through the apertures of the belt and elongate slots/circular apertures of the support deck. The elongate slots are aligned with the apertures formed in the belts to ensure a flow of air to each of the apertures as the belts are driven along the feed path. To ensure that airflow is not restricted along the length of the elongate slots, i.e., due to deformation of the belt into an elongate slot, elongate slots are fabricated to maintain a threshold thickness dimension. That is, by maintaining a threshold minimum thickness, deformation of the belt may be obviated to prevent the belt from restricting or closing the flow through the slots and circular apertures of the support deck.

A need, therefore, exists for a print module and conveyance system which is capable of processing consecutive mailpieces which vary in thickness dimension while maintaining a robust vacuum conveyance/manifold system.

SUMMARY OF THE INVENTION

A vacuum conveyance/manifold system is provided for processing mailpieces. The vacuum conveyance/manifold system includes at least one conveyor belt and a compliant deck disposed beneath and supporting an underside surface of the conveyor belt. The conveyor belt has rows of aligned apertures disposed therein and a drive surface for engaging a face surface of each of the mailpieces. The compliant deck defines a neutral axis in bending and has a high elongation, low modulus material in a portion of the deck which is distal from the bending neutral axis, and a high yield strength, high modulus material in a portion of the deck which lies coincident with the bending neutral axis. Furthermore, the compliant deck has a plurality of elongate slots formed in the high elongation, low modulus material, which elongate slots are aligned, and in fluid communication, with the rows of apertures in the conveyor belt. A flexible manifold system, having a plurality of flexible tubes, is in fluid communication with the elongate slots of the compliant deck and the vacuum source for developing a pressure differential across each of the mailpieces when in contact with the drive surface of the conveyor belt.

BRIEF DESCRIPTION OF THE DRAWINGS

The accompanying drawings illustrate presently preferred embodiments of the invention and, together with the general description given above and the detailed description given below serve to explain the principles of the invention. As shown throughout the drawings, like reference numerals designate like or corresponding parts.

DETAILED DESCRIPTION OF THE INVENTION

The invention is described in the context of a printing module and underlying conveyance system for a mailpiece inserter, though it will be appreciated that the system and method described herein is applicable to processing variable thickness mailpieces which are fed consecutively. Furthermore, the system and method of the present invention is applicable to mailpieces wherein a face surface thereof is disposed in register and guided along a registration plate during processing. For example, such registration may be required when inspecting a mailpiece, reading postage indicia or interpreting scan codes on the face of a mailpiece. Consequently, the detailed description and illustrations are merely indicative of an embodiment of the invention and the invention should be broadly interpreted in accordance with the appended claims.

Compliant Conveyance System

Figure 1:
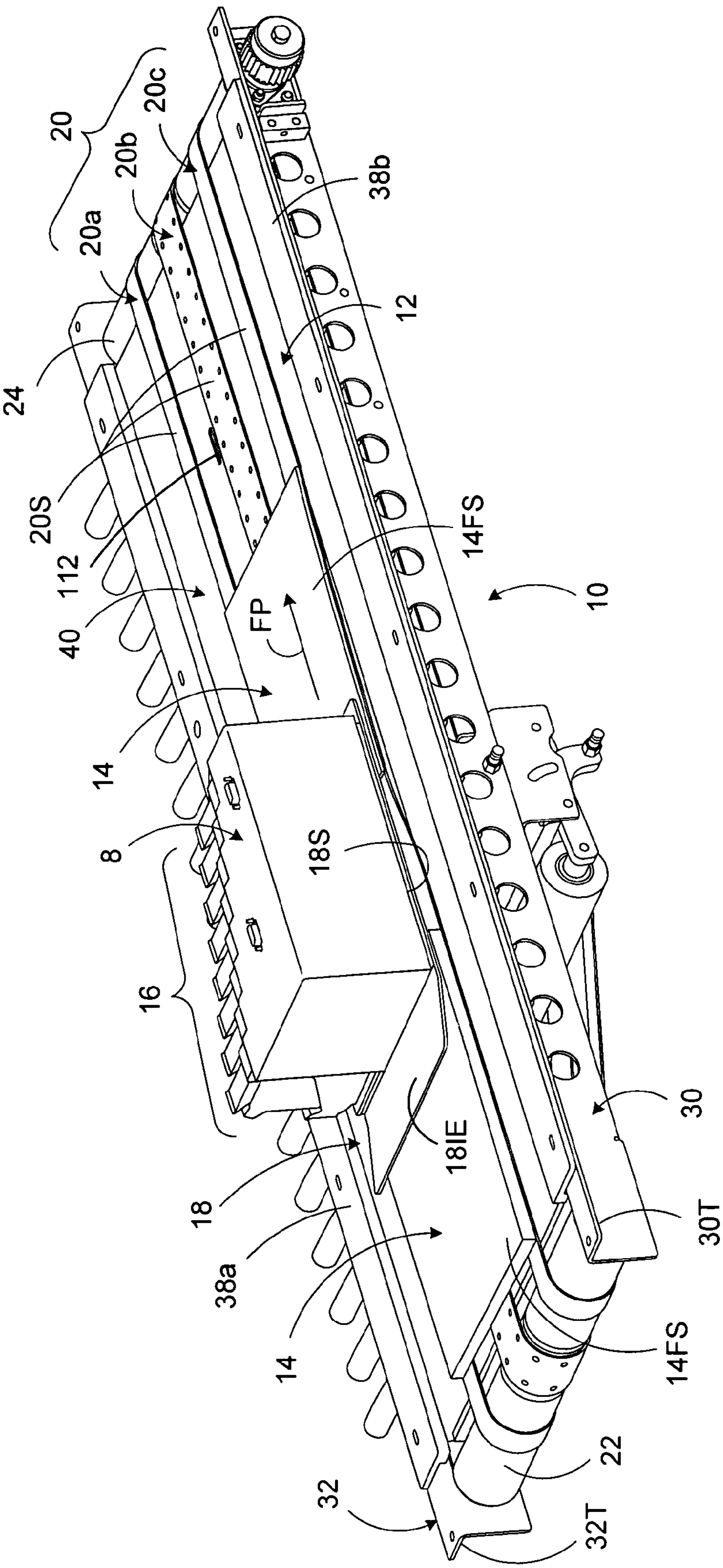
FIG. 1 is a top perspective view of a compliant conveyance system according to the present invention wherein consecutive thin and thick mailpieces are fed along a mailpiece feed path and between a print head assembly and a compliant deck of the conveyance system.
Figure 2:
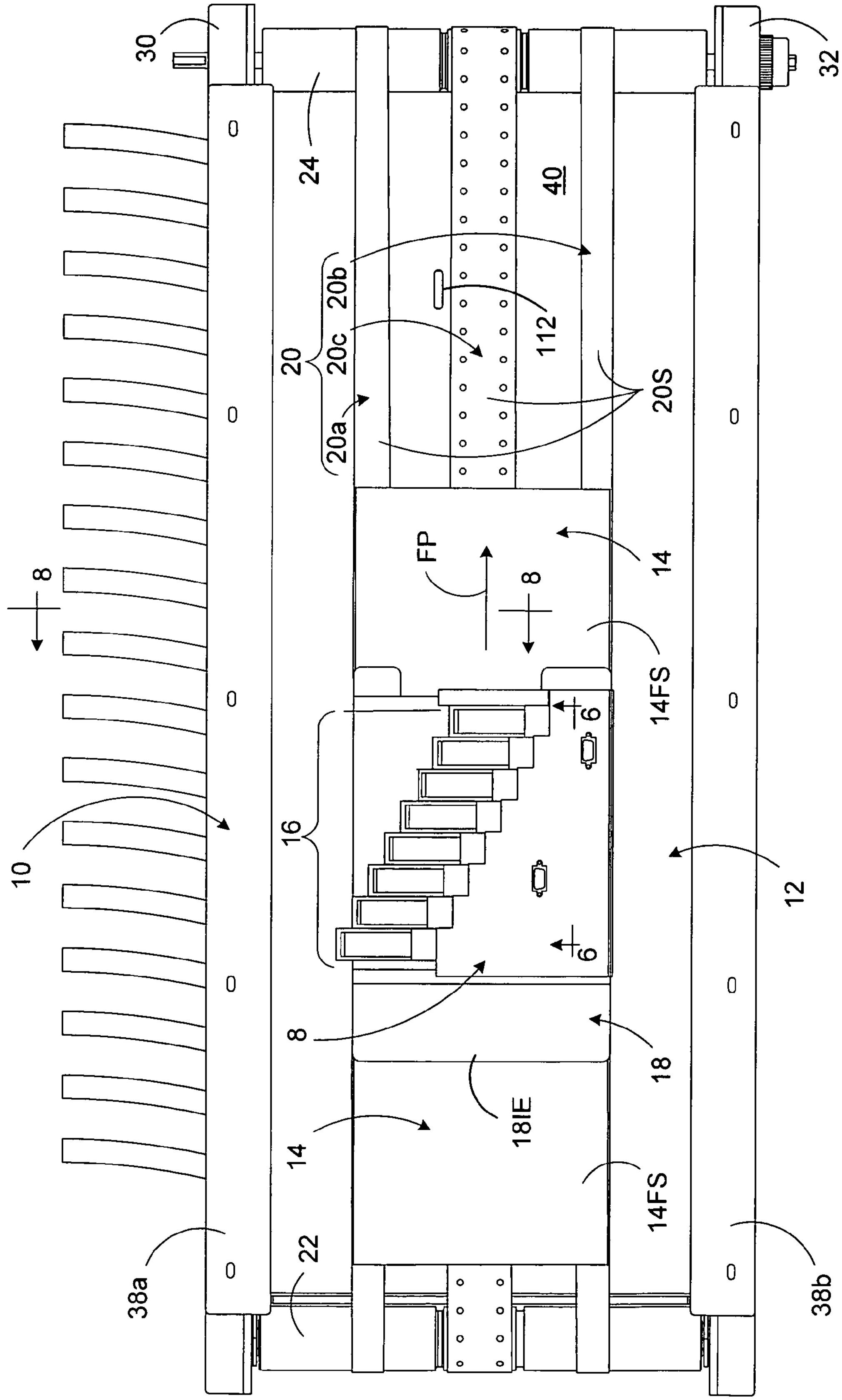
FIG. 2 is a top view of the compliant conveyance system shown in FIG. 1 wherein a central vacuum belt frictionally engages a face surface of each mailpiece to transport the mailpieces along the feed path.

FIGS. 1 and 2 depict perspective and top views of a print head assembly 8 disposed over a compliant conveyance system 10. The compliant conveyance system 10 is operative to process mailpieces 14 which vary in thickness from about 0.10 inches to about 0.5 inches. In one embodiment of the compliant conveyance system 10, a compliant deck 12 is provided having a low characteristic stiffness in a direction parallel to the feed path FP of mailpieces being processed and a high characteristic stiffness in a direction orthogonal to the feed path. That is, the characteristic stiffness parallel to the feed path is lower (i.e., 50% or more) than the characteristic stiffness in the orthogonal direction.

The compliant conveyance system 10 is adapted for operation with a bank of print heads 16 arranged in a staggered or stepped array. Furthermore, the bank of print heads 16 includes a registration/skid plate 18 having a contact surface 18S for registering a first surface 14FS of each mailpiece 14. A pivotable support/instrumentation rack (not shown in the subject illustrations) supports the print head module 8, to maintain the position of the print heads 16 relative to the underlying compliant conveyance system, i.e., a clearance gap therebetween. The support/instrumentation rack will be discussed in greater detail hereinafter.

Figure 3:
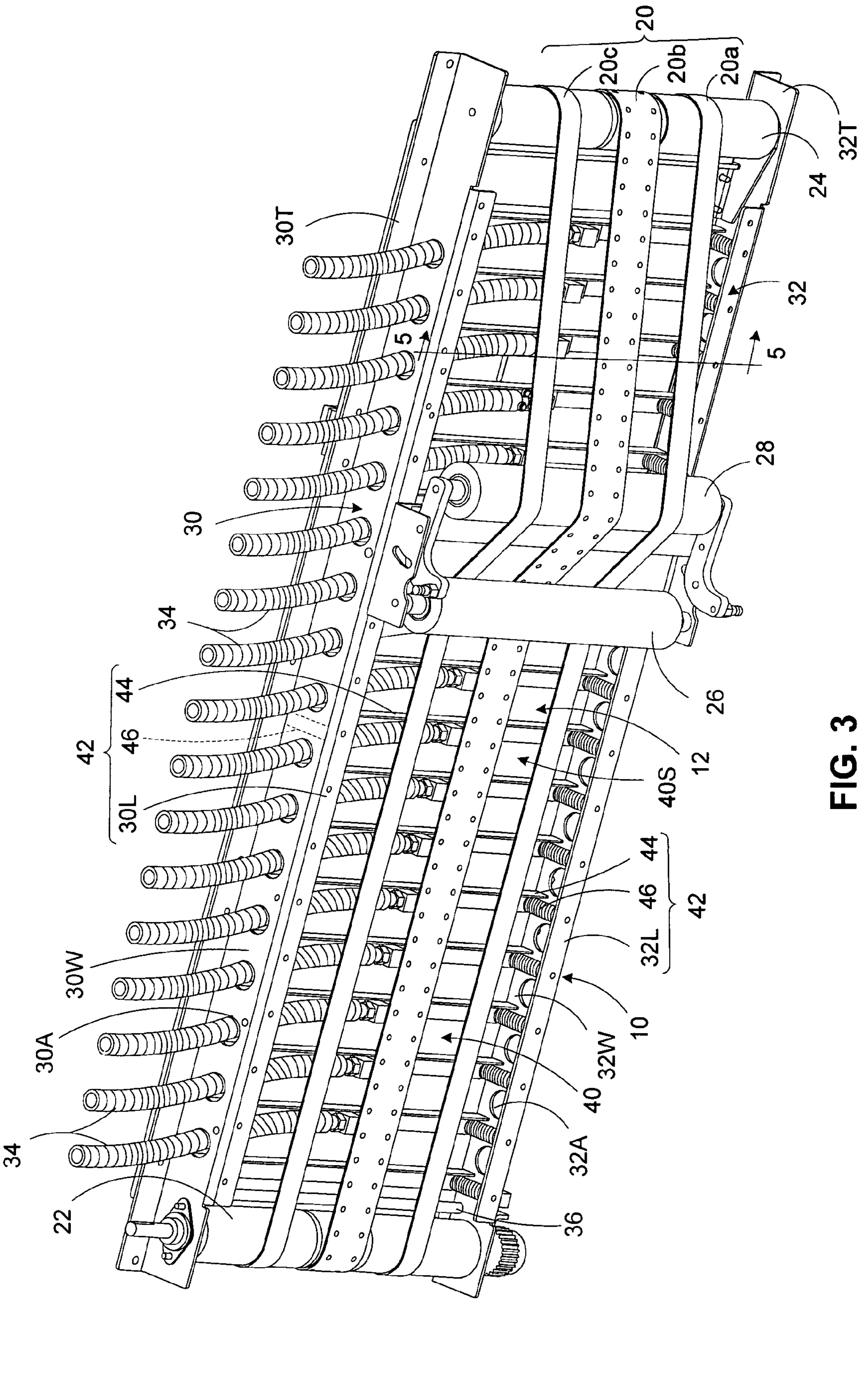
FIG. 3 is a bottom perspective view of the compliant conveyance system including a spring biasing device operative to bias the compliant deck upwardly toward a registration plate of the print head assembly.

The compliant conveyance system 10 includes at least one conveyor belt 20 having a drive surface 20S which is adapted to oppose the contact surface 18S of the registration plate 18. In the illustrated embodiment, the compliant conveyance system 10 employs three (3) belts 20*a*, 20*b*, 20*c* which are spaced apart, though it should be appreciated that a fewer or greater number of belts 20 may be employed. In FIGS. 1, 2 and 3, the conveyor belts 20 rotate around a plurality of rollers, e.g., end turn-around rollers 22, 24, tensioning rollers 26, 28 (see FIG. 3) and drive rollers (not shown) which are driven by a drive motor (also not shown). The end rollers 22, 24 are each mounted for rotation to side beam members 30, 32 to produce a rigid box structure having a generally rectangular shape. Each of the side beam members 30, 32 have a generally S-shaped or Z-shaped cross-section wherein an upper flange 30T, 32T (see FIGS. 1 and 3) projects outwardly away from the conveyor belts 20 and a lower flange 30L, 32L (see FIG. 3) projects inwardly toward the conveyor belts 20. Furthermore, the web 30W, 32W of at least one of the beam members 30, 32 includes a plurality of apertures 30A, 32A which are used to receive a plurality of flexible tubes 34 employed in a Flexible Manifold Vacuum System 50 (described in greater detail hereinbelow).

Figure 4:
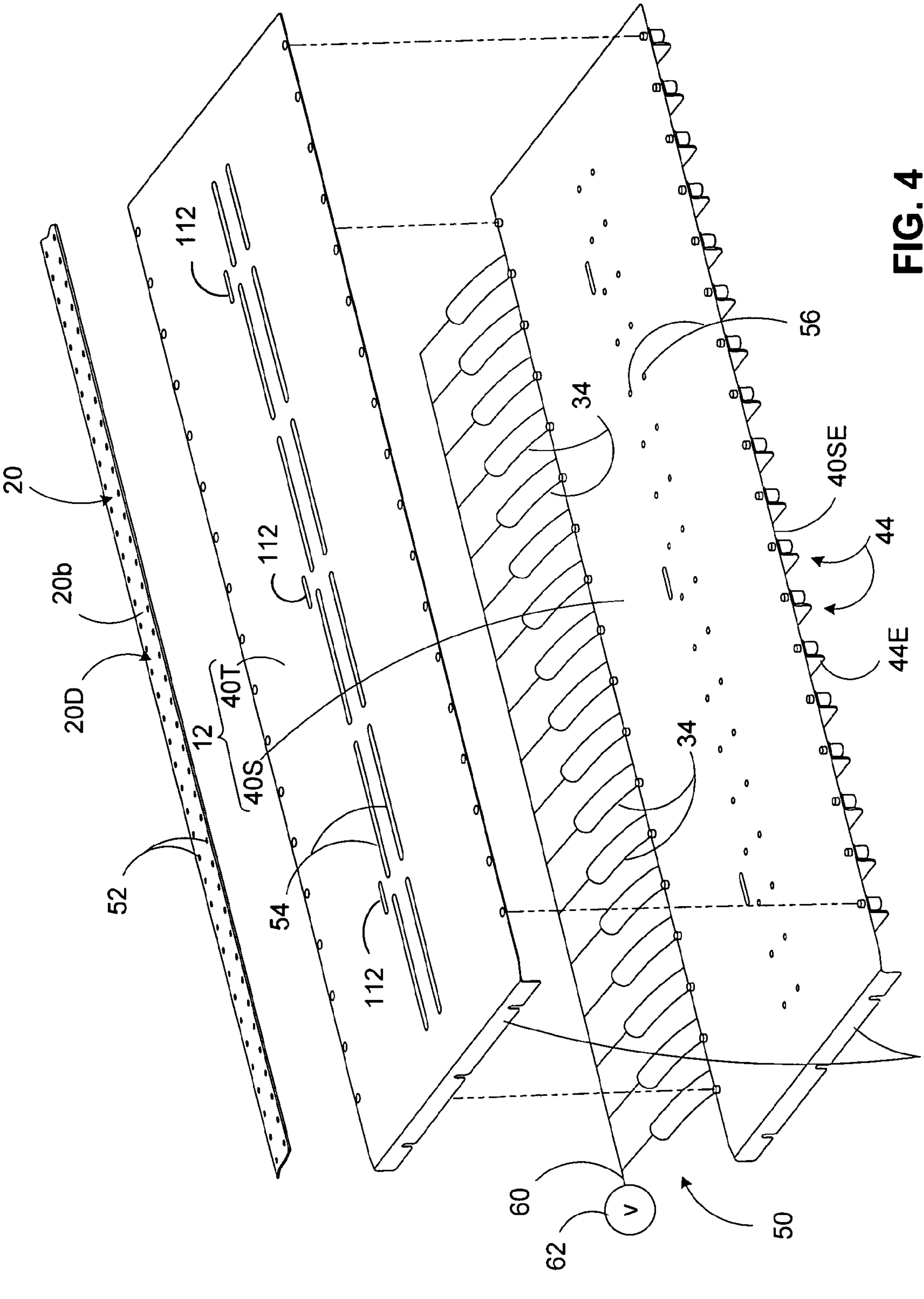
FIG. 4 is an broken-away partially exploded top view of the compliant deck including a high elongation surface layer and a high yield strength support layer which cooperate to provide a continuous flexible deck.
Figure 5:
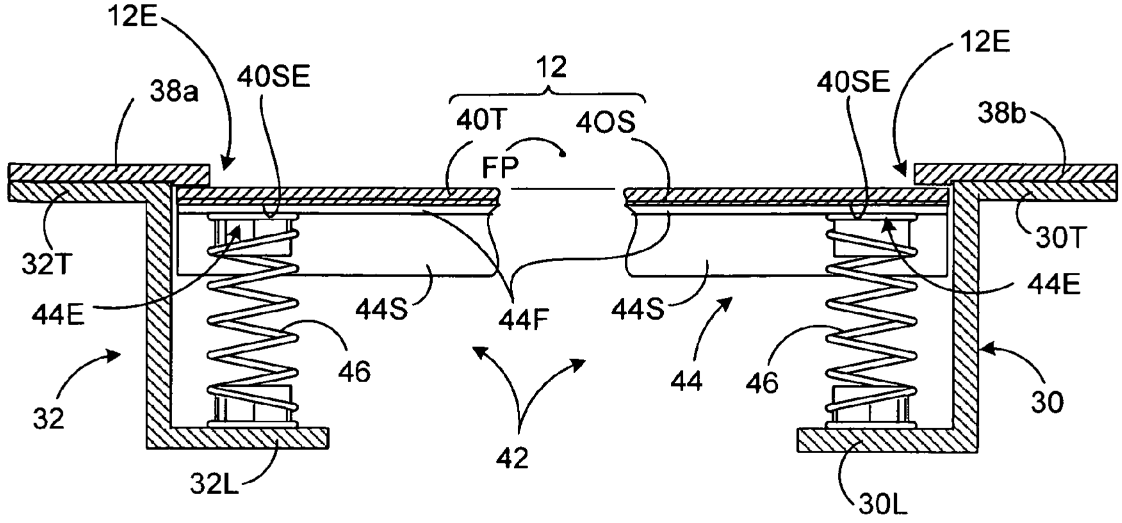
FIG. 5 is a partially broken away sectional view of the compliant conveyance system taken substantially along line 5-5 of FIG. 3 depicting the relevant details of the spring biasing device.

The compliant deck 12 is disposed beneath and supports the conveyor belts 20. In FIGS. 3, 4 and 5, the compliant deck 12 comprises at least one continuous, i.e., uninterrupted, layer of a high-modulus, low-friction, high yield strength material such as a polished spring steel. In the described embodiment, the compliant deck 12 includes a support layer 40S (see FIGS. 4, 5 and 6) of spring steel and a surface layer 40T of Teflon® ("Teflon" is a registered trademark of the Dupont Nemours Corporation located in Wilmington, state of Delaware) or Poly-Tetra-Flora-Ethylene (PFTE). The support layer 40S spring steel has a thickness dimension T1 (see FIG. 6) of between about 0.010 inches to 0.015 inches, a Young's Modulus (e) of between about $2\times10^5$ MPa to about $2.2\times10^5$ MPa, an elongation (s) of between about 6% to about 8%, and a Yield strength ($\sigma$) of between about 1100 MPa to about 1300 MPa. The surface layer 40T of PFTE has a thickness dimension T2 (see FIG. 6) of between about 0.058 inches to 0.072 inches, a Young's Modulus (e) of between about 400 MPa to about 800 MPa, an elongation of between about 300% to 600% and a friction coefficient (K) of less then about 0.15. The characteristic stiffness of the compliant deck 12, i.e., the combined layers 40S, 40T, parallel to the feed path is about two-hundred percent (200%) to about four hundred percent (400%) of the characteristic stiffness of the compliant deck 12 in a direction orthogonal to the feed path.

The support layer 40S dominates the flexure and stiffness of the compliant deck 12 due to the high modulus, high yield strength of spring steel. As a result, the bending neutral axis of the compliant deck 12, i.e., the combined layers 40S, 40T, lies within the thickness dimension of the support layer 40S. Despite the much larger thickness dimension of the PFTE layer 40T and its distance from the bending neutral axis, its contribution to the overall stiffness of the compliant deck 12 is negligible due to the high elongation, low modulus of the PFTE layer 40T. Consequently, the compliant deck 12 may also be characterized as a combination of layers 40S, 40T having a high modulus, high yield strength material at the core of the deck 12, i.e., proximal to the bending neutral axis, and a high elongation, low friction material at a free edge of the deck 12, i.e., an edge which is distal from the core and parallel thereto. This characterization of the compliant deck 12 will be more clearly understood when discussing the thickness requirements of the Flexible vacuum conveyance/manifold system hereinafter.

Both the support and surface layers 40S, 40T are disposed between the side beam members 30, 32 and retained by forward flanges 40F which mount to a cross beam member 36 (see FIG. 3) disposed immediately downstream of the forward turn-around roller 22. Additionally, edge retention strips 38*a*, 38*b* (see FIG. 5) are affixed to the upper flanges 30T, 32T of the respective side beam members 30, 32 and project inwardly over the upper peripheral edge 12E (see FIG. 5) of the compliant deck 12 i.e., over the surface layer 40T thereof.

In FIGS. 3, 4 and 5, the compliant deck 12 is supported by a spring biasing device 42 comprising a plurality of transverse stiffening members 44 and spring biasing members 46. More specifically, each transverse stiffening member 44 has a generally L-shape and is disposed beneath and across the support layer 40S of the compliant deck 12, i.e., orthogonal to the compliant belts 20. Furthermore, the stiffening members 44 are disposed at regular intervals, i.e., are evenly spaced across the underside of the support layer 40S of the compliant deck 12. In the described embodiment, the stiffening members 44 are disposed at intervals of between one (1) to two (2) inches. A flange portion 44F of each stiffening member 44 abuts the underside of the support layer 40S while a stiffening portion 44S projects downwardly to increase the stiffness of the support layer 40S in a direction orthogonal to the feed path FP (shown as a point going into the plane of the drawing sheet in FIG. 5) of the conveyance system 20. Each end 44E of a stiffening member 44, i.e., along the upper surface of the flange portion 44F, is affixed to the underside peripheral edge 40SE of the support layer 40S.

Pairs of spring biasing members 46 support each end 44E of a respective stiffening member 44 and, due to the structural integration of the stiffening portion 44S, function to provide a vertical spring biasing force across the width, i.e., orthogonal to the feed path, of the compliant deck 12. Each spring biasing member 46 is disposed between the underside of the flange portion 44F of a respective stiffening member 44 and the inwardly projecting flanges 30L, 32L of the side beam members 30, 32.

Figure 6:
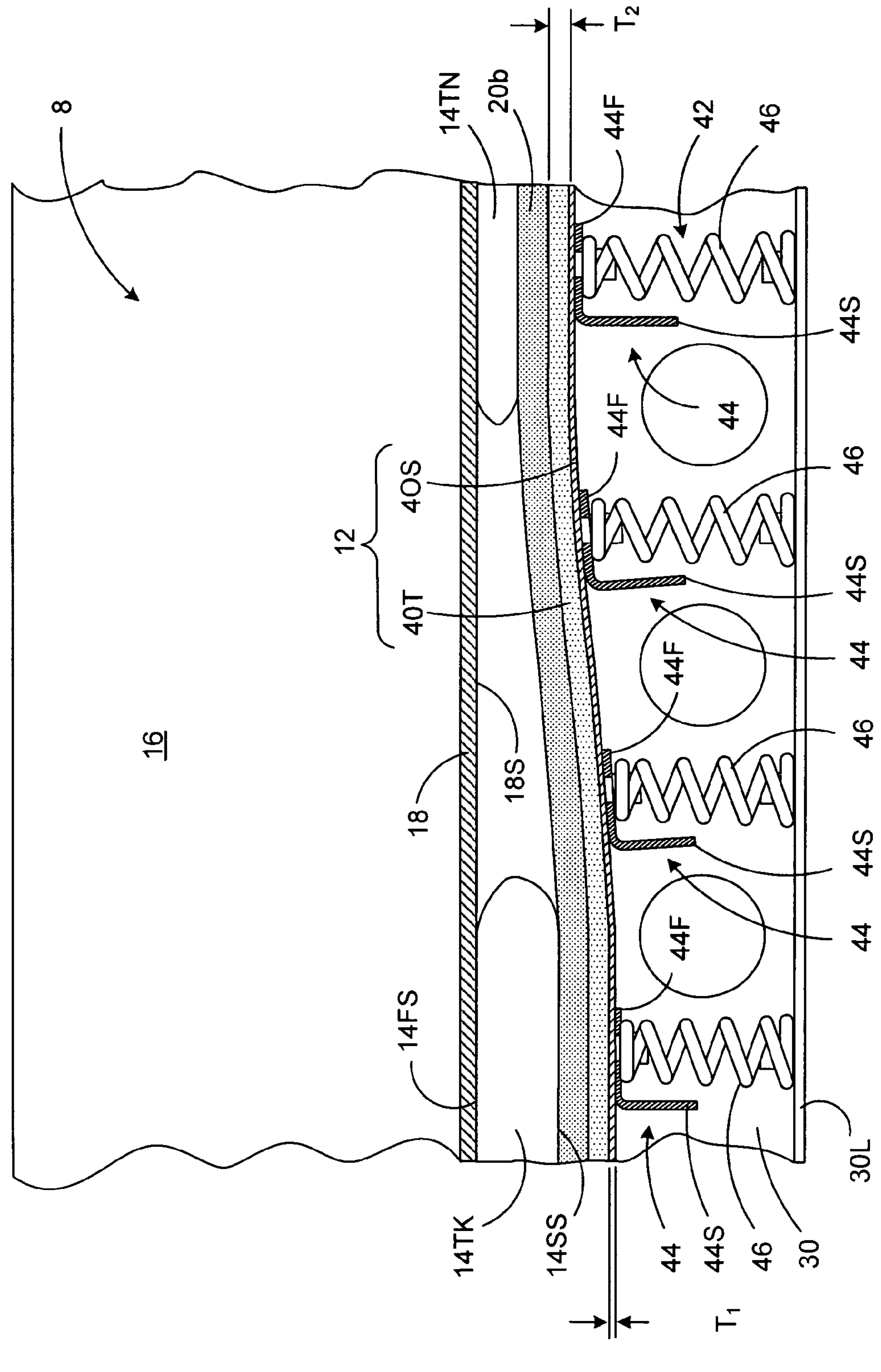
FIG. 6 is an enlarged, partially broken away sectional view taken substantially along line 6-6 of FIG. 2 depicting the compliant conveyance system as consecutive thin and thick mailpieces are fed along the feed path and processed by the print head assembly.

FIG. 6 depicts an enlarged view of the compliant deck 12 when conveying consecutive thin and thick mailpieces 14TN, 14TK. The mailpieces 14TN, 14TK are aligned along an upper face or first surface 14FS against the registration surface 18S of the registration plate 18. Furthermore, friction forces, (forces developed along and between the lower face or second surface 14SS of the mailpiece 14 and the conveyor belts 20), convey the mailpieces 14TN, 14TK beneath and passed the nozzles of the print heads 16. As mailpieces 14 move beneath the print module 8, the underlying compliant deck 12 undulates in a wave-like manner. The highly resilient support layer 40S of spring steel flexes vertically downward to accommodate the thickness dimension of, and thickness variations between, each of the thin and thick mailpieces 14TN, 14TK.

Registration against the plate 18 is maintained by vertical forces imposed by the spring biasing device 42. The vertical forces originate with each pair of spring members 46 at the proximal ends 44E of each stiffening member 44 and are conveyed in a substantially uniform manner across the complaint deck 12. That is, the each stiffening member 44 transfers the downward motion of each mailpiece, i.e., at the center of the compliant deck 12, to the peripheral edges 44E, where the spring biasing members 46 impose a vertical force in a direction opposing the downward displacement. Furthermore, the spring biasing device 42 may be viewed as a collection of independently operating springs which define a plurality of discrete rows. That is, the stiffening member 44 may be viewed as a substitute for additional spring members disposed across the width of the compliant deck 12. As such, the regions between the stiffening members 44 are soft and compliant to facilitate vertical displacement of each mailpiece. In the described embodiment, the compliant deck 12 and spring biasing device 42 accommodates up to about one-half (½) inches of displacement. While the support layer 40S is highly compliant, the use of a high yield strength spring steel prevents plastic deformation of the compliant deck 12, and can perform millions of cycles without failure.

The spring rate constant of each spring member 46 is principally a function of the desired vertical deflection of the compliant deck 12, the number of transverse stiffening members 44, and the stiffness of the support layer 40S of spring steel. Secondary considerations relate to the tension loads applied to the compliant belts 20 and the mass of the flexible vacuum conveyance/manifold system 50 which is structurally integrated with the spring biasing device 42. As a general rule, the vertical forces imposed by the spring members 46 are sufficiently high to maintain the mailpieces 14TN, 14TK against the registration plate 18, yet sufficiently low to prevent damage to the upper face surface 14FS of each mailpiece 14.

While the compliant conveyance system 10 of the present invention includes a spring biasing device 42 including a plurality of coil springs 46, it will be appreciated that other devices or materials may be employed to provide the requisite spring rate. For example, a high elongation elastomer rubber (not shown) may be disposed between the transverse stiffening members 44 and the support platform, i.e., the flange portion of the side beam members 30, 32, to provide the necessary spring biasing forces. Alternatively, a high elongation foam/foam rubber (also not shown) may be molded between the underside of the support layer 40S and an underlying support.

In summary, the combination of continuous support and surface layers 40S, 40T, i.e., without breaks or segments, along with a spring biasing device which imparts anisotropic stiffness properties to the compliant deck 12 (low stiffness properties parallel to the feed path and high stiffness properties orthogonal thereto), significantly enhances the fatigue life of the conveyance system 10. Furthermore, the high degree of compliance enables processing of consecutive thin and thick mailpieces. That is, the compliant deck 12 is capable of processing mailpieces 14TN, 14TK up to one-half inches (½") in thickness. Moreover, throughput, i.e., the number of mailpieces processed per unit of time, increases inasmuch as mailpieces 14TN, 14TK, whether or not disparate in thickness, may be closely spaced, i.e., between four (4) to six (6) inches apart.

The following discusses the functional and structural interaction of the compliant deck 12 and the flexible vacuum conveyance/manifold system 50. It will be appreciated that, while the teachings associated with each are separate and distinct, the systems are structurally integrated and interdependent.

Flexible Vacuum Conveyance/Manifold System

Figure 8:
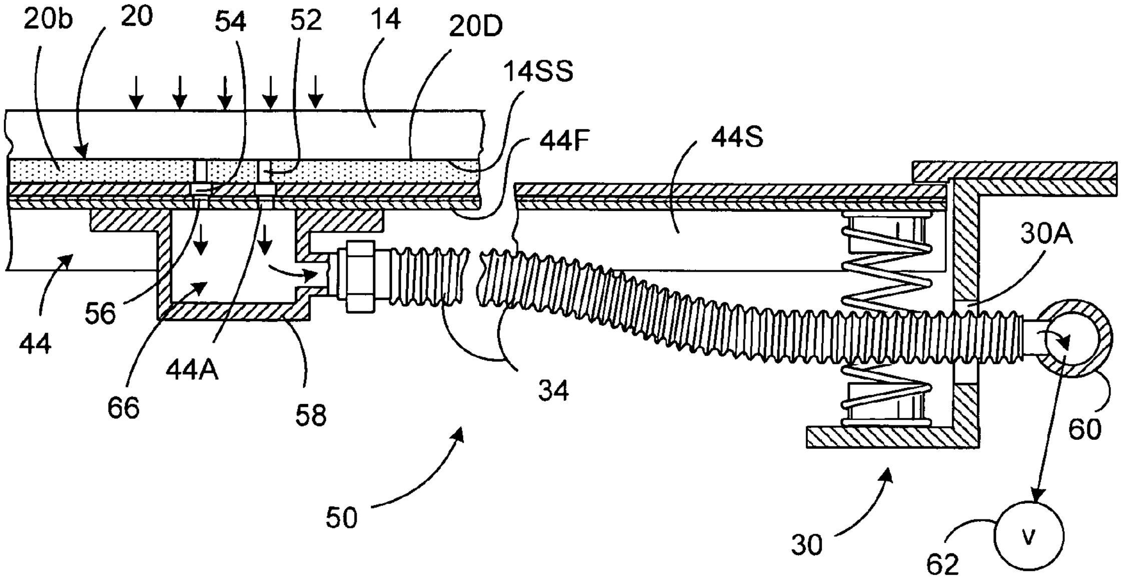
FIG. 8 is a partially broken away sectional view taken substantially along line 8-8 of FIG. 2 depicting the fluid communication path from the central vacuum belt to a vacuum source through corrugated flexible tubing.
Figure 7:
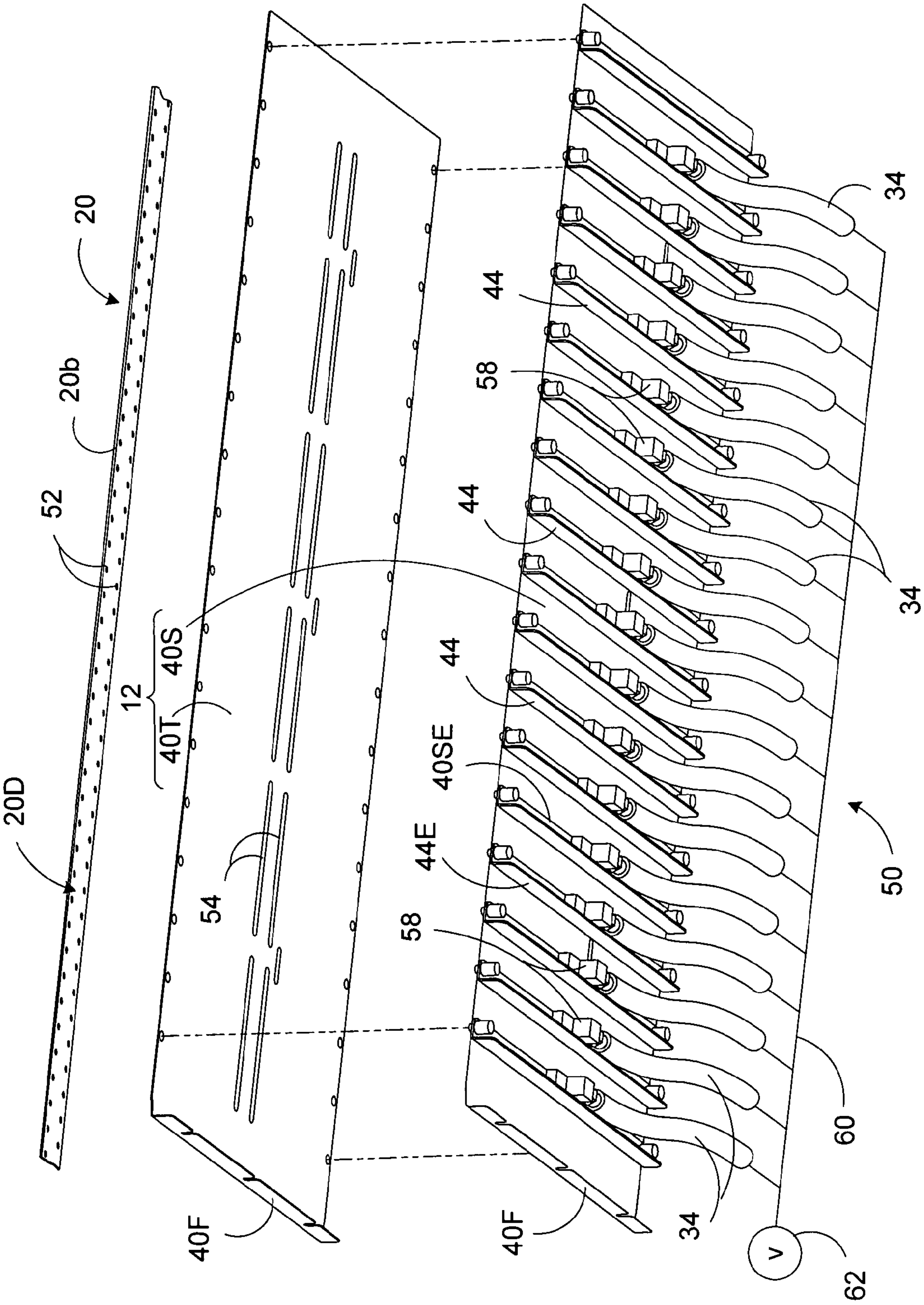
FIG. 7 is an broken-away partially exploded bottom view of the compliant deck including the relevant details of a flexible vacuum conveyance/manifold system adapted to maintain high flexibility and reliability.

In FIGS. 4, 7 and 8, the flexible vacuum conveyance/manifold system 50 is operative to produce a pressure differential across each mailpiece 14 to urge the lower face or second surface 14SS of each mailpiece 14 into frictional engagement with the upper drive surfaces 20D (see FIG. 8) of the compliant belts 20. More specifically, the flexible vacuum conveyance/manifold system 50 is adapted to accommodate the motion of the compliant deck 12 without increasing or affecting the stiffness and/or mass properties thereof. With respect to the latter, the fatigue life of the compliant deck 12 (i.e., particular the spring biasing device 42) is a function its mass. Accordingly, an objective of the vacuum conveyance/manifold system 50 is to minimize the weight added to the compliant conveyance system 10.

The flexible vacuum conveyance/manifold system 50 comprises: a plurality of apertures 52 disposed in at least one of the conveyor belts 20, a plurality of apertures 54, 56 (see FIGS. 4 and 8) disposed in the compliant deck 12 and in fluid communication with the apertures 52 of the at least one conveyor belt 20, a plurality of apertures 44A (see FIG. 8) disposed in the flange portion 44F of the stiffening member 44 and in fluid communication with the apertures 54, 56 disposed in the compliant deck 12, a linear plenum 58 (see FIGS. 7 and 8) disposed in combination with each of the stiffening members 44 and in fluid communication with the apertures 44A of the respective stiffening member 44, (FIG. 8), a plurality flexible vacuum tubes 34 (see FIGS. 7 and 8) disposed in fluid communication with each linear plenum 58, a vacuum manifold 60 disposed in fluid communication with the plurality of flexible vacuum tubes 34, and a vacuum source 62 disposed in fluid communication with the vacuum manifold 60.

In the described embodiment, the central conveyor belt **20*b* includes rows of apertures 52 which are aligned with elongate slots 54 formed in the surface layer 40T of the compliant deck 12. The elongate slots 54 are disposed over, and are aligned with, rows of apertures 56 disposed through the support layer 40S, i.e., the sheet of spring steel, of the compliant deck 12. Furthermore, rows of apertures 44A are aligned with the apertures 56 of the support layer 40S to permit airflow through the flange portion 44F of the stiffening member 44. Each linear plenum 58 defines a plenum chamber 66 which is disposed over, and in fluid communication with, both apertures 44 formed in the stiffening member 44. The flexible tubing 34 provides a flexible path from each plenum chamber 66 to the vacuum manifold 60. While FIGS. 4 and 7 do not show the flow through the vacuum manifold 60, it will be appreciated that the vacuum manifold 60 may vary in diameter or provide multiple flow paths to ensure relatively constant flow/pressure to each of the plenum chambers 66**.

In operation, the vacuum source 62 draws a vacuum which initiates fluid flow through the vacuum manifold 60, through the system of flexible tubing 34 and into the plenum chambers 66 of each linear plenum 58. The pressure differential established by the vacuum source 62 in each of the linear plenums 58 effects fluid flow through the apertures 52 of the central conveyor belt **20*b*, through the elongate slots 54 of the upper surface layer 40T and the aligned apertures 56, 44A of the support layer 40S and the stiffening member 44. As the conveyor belt 20*b* slides over the surface layer 40T, the each aperture 52 of the conveyor belt 20*b* remains in fluid communication with at least one of the elongate slots 54 inasmuch the slots 54 span several conveyor belt apertures 52. Consequently, all of the apertures 52 are operative to produce a pressure differential along the drive surface 20D of the belt 20*b* and across each mailpiece 14, wherever the mailpiece 14** may be located.

To accommodate the motion of the compliant deck 12 and ensure adequate flexibility of the compliant conveyance system 10, the flexible vacuum conveyance/manifold system 50 employs flexible corrugated tubing 34 between each linear plenum 58 and the vacuum manifold 60. Furthermore, the flexible corrugated tubing 34 extends through oversized apertures 30A in the side beam member 30 to eliminate points of restraint with may stiffen or reduce the flexibility of the vacuum conveyance/manifold system 50.

Yet another feature of the flexible vacuum conveyance/manifold system 50 relates to producing a robust reliable vacuum without increasing the stiffness of the compliant deck 12. More specifically, to produce an adequate vacuum, the depth or thickness of the elongate slots 54 must remain large, e.g., greater than about 0.050 inches in thickness, to prevent the conveyor belt **20*b* from flexing/deforming into the aperture channel and retarding airflow in a longitudinal direction along the elongate slots 54**.

To address this concern, the flexible vacuum conveyance/manifold system 50 varies the stiffness and elongation properties of the deck 12 to obtain the requisite thickness, i.e., thickness/height of the elongate slots 54 without adversely impacting the stiffness or flexibility of the compliant conveyance system 10. More specifically, the compliant deck 12 incorporates a high elongation, low modulus material in the portion of the deck 12 which is exposed to the maximum bending strains (i.e., elements farthest from the bending neutral axis). Another property of this portion relating to the power requirements to drive the conveyor belts 20, is that the material have a characteristic low friction coefficient to facilitate sliding between the belts 20 and the deck 12. Additionally, the compliant deck 12 incorporates a high yield strength, high modulus material in the portion of the deck 12 which lies coincident with the bending neutral axis, i.e., at the core of the deck 12. As such, in portions of the deck 12 where a threshold thickness is required to form deep slots 54, the deck 12 is composed of high elongation, low modulus material, and in portions of the deck 12 which require high strength, the deck 12 is composed of high yield strength, high modulus material.

In the described embodiment, the deck 12 employs multiple layers to establish the stiffness and elongation properties for the flexible vacuum conveyance/manifold system 50. Specifically, the elongate slots 54 are formed in a surface layer 40T of high elongation material such as PTFE. Accordingly, the depth/thickness of the vacuum slot is maintained without adversely impacting the overall stiffness of the compliant deck 12. Furthermore, the surface layer 40T of high elongation material is not affixed to the underlying support layer 40S, i.e., not affixed along the mating interface, but relies on the vacuum pressure to maintain contact between the layers 40T, 40S and effect fluid flow through the elongate slots 54 and circular apertures 56 of the compliant deck 12. The layers 40T, 40S, therefore, provide a slip plane therebetween to minimize the contribution of the area moment of inertia I (a function of the thickness cubed) to the stiffness of the compliant deck 12. While the present invention depicts a compliant deck having support and surface layers 40S, 40T, it will be appreciated that three or more layers may be employed to build the necessary thickness and depth of the elongate slots 54.

The flexible vacuum conveyance/manifold system 50 employs lightweight polymers/plastic materials to minimize the weight/mass of the compliant conveyance system 10. The flexible tubing 34 is fabricated from corrugated molded plastic while the linear plenum is manufactured from a lightweight machinable phenolic block. Similarly, the PTFE is a lightweight polymer which minimizes the weight of the compliant conveyance system 10.

In summary, the flexible vacuum conveyance/manifold system 50 integrates with the compliant conveyance system 10 in a manner which compliments the desired stiffness properties. Flexible polymer tubing is employed facilitate motion of the compliant deck 12. Moreover, the thickness of the surface layer 40T is maintained to ensure that the elongate slots 54 are sufficiently deep to prevent the disruption of airflow and ability to draw a vacuum. Furthermore, the flexible vacuum conveyance/manifold system is fabricated from lightweight polymer/plastic material to reduce the mass and improve the fatigue life of the compliant conveyance system 10.

Registration/Skid Plate

Referring again to FIG. 1, the compliant conveyance system 10, and its ability to process consecutive thin and thick mailpieces 14, presents several unique challenges with respect to the design/construction of the registration plate 18. While prior art skid plates merely prevent a face surface of a mailpiece from contact with the print head nozzles, the registration plate 18 according to the present invention, not only maintains a "stand-off" distance between the mailpiece 14 and the print heads 16, but also provides a contact surface which presses against each mailpiece 14, (particularly thick mailpieces 14TK). That is, as mailpieces 14 move along the deck 12 and pass under the registration plate 18, the spatial position of the registration plate 18 remains fixed while the compliant deck 12 deforms/deflects in response to the pressure applied by each passing mailpiece 14.

The vertical loads imposed on each mailpiece 14 can present difficulties when printing, particularly when printing on a mailpiece surface which deforms under load. An example of such a mailpiece includes one which may contain material to protect the internal contents of the mailpiece (e.g., padding or bubble-wrap). It will be appreciated that when such a mailpiece passes under a registration/skid plate having a large opening, the soft compliant face surface of the mailpiece can bow inwardly, toward the print head nozzles. As a result the requisite stand-off distance is not maintained and print quality can be compromised.

Figure 9:
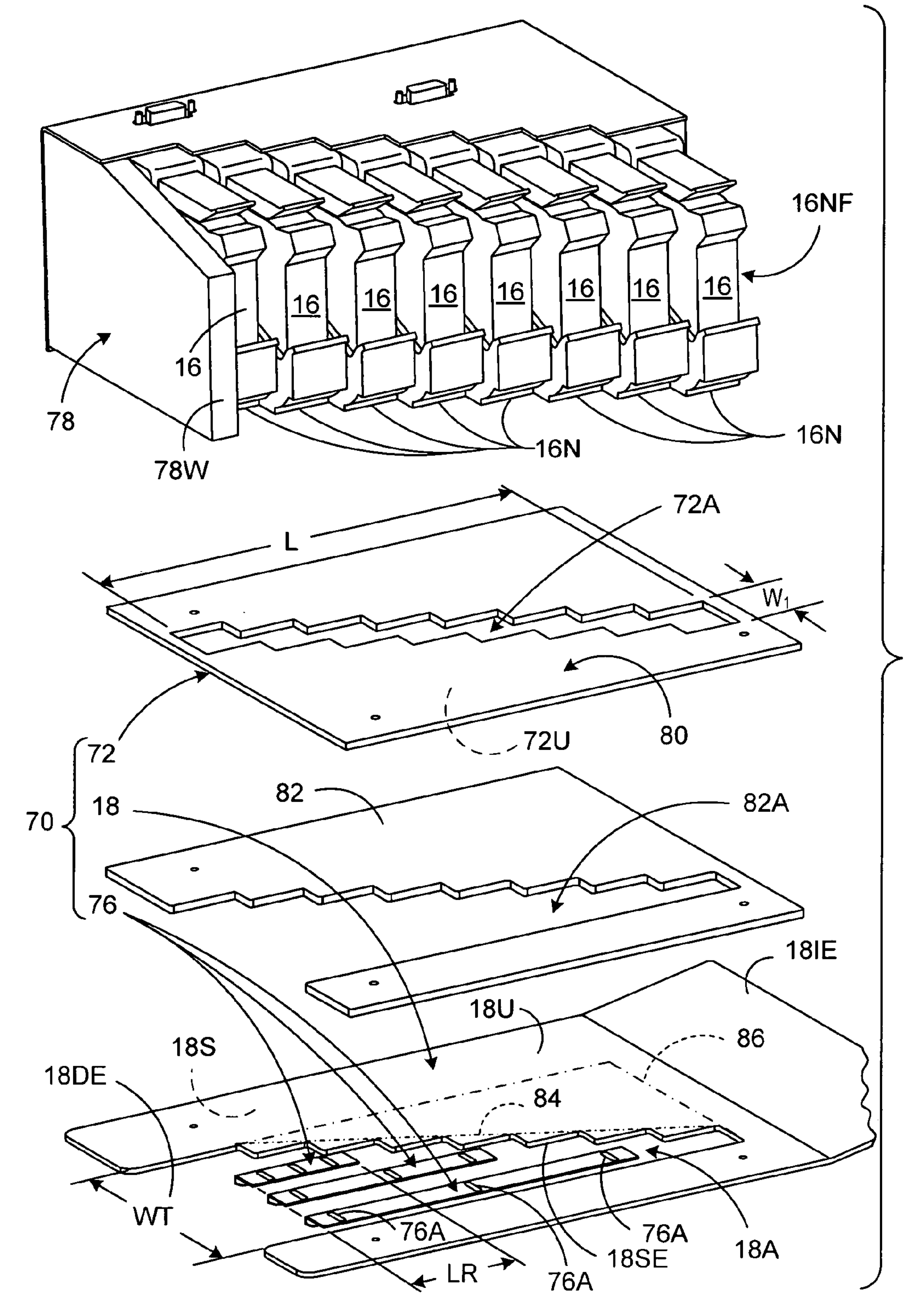
FIG. 9 is a partially exploded rear perspective view of the print head assembly including a staggered array of print heads, a registration plate, a spacer plate, a mounting plate, and a plurality of runners affixed to the mounting plate.
Figure 10:
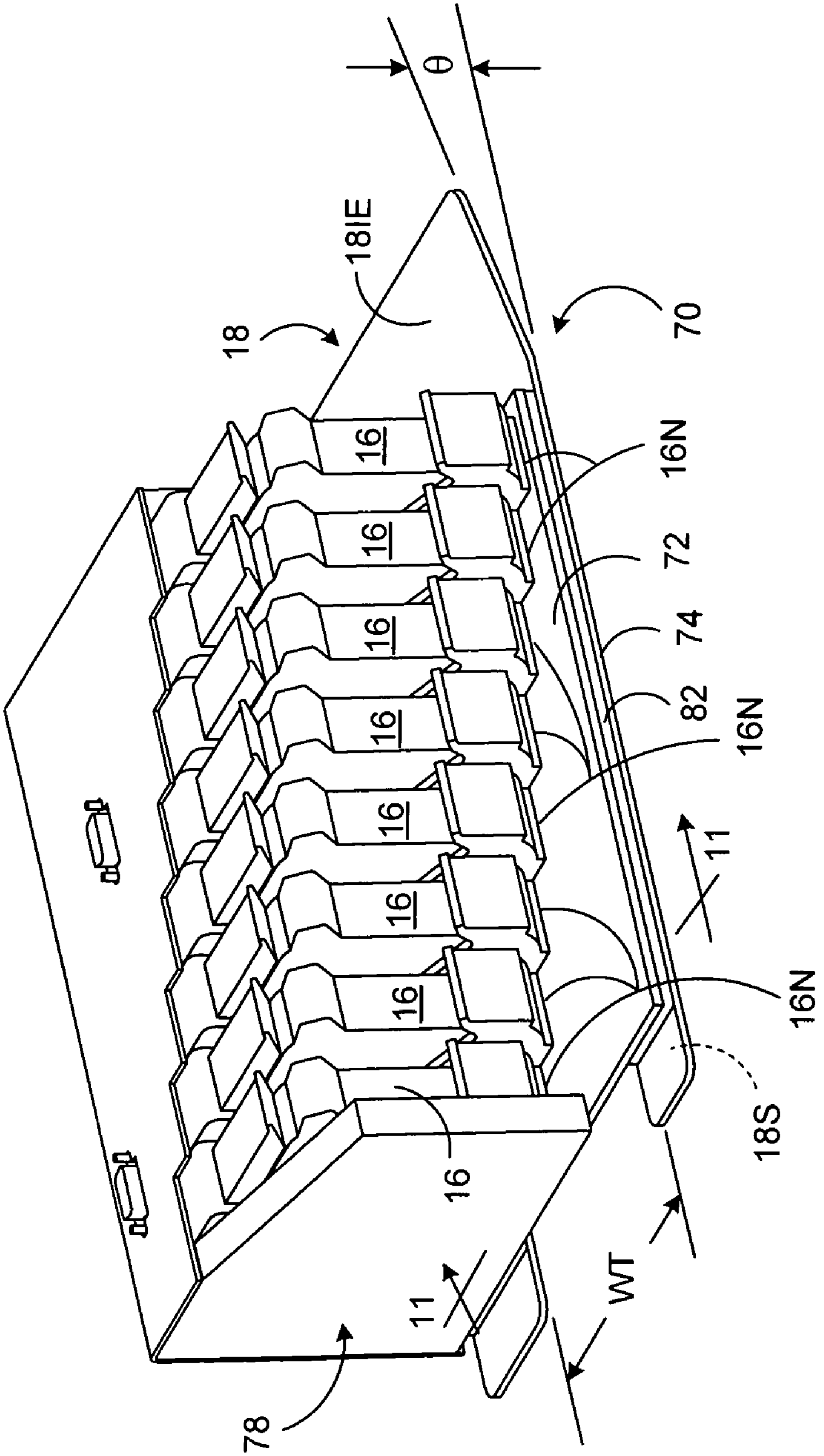
FIG. 10 is an isolated rear perspective view of the print head assembly depicting the print heads, plates and runners when arranged and assembled.

In FIGS. 1, 9 and 10, a registration plate assembly 70 (best seen in FIG. 9) is provided for the compliant conveyance system 10. The registration plate assembly 70 is adapted for use in combination with the array of print heads 16 and is operative to react vertical loads applied by the mailpiece 14 during processing. The registration plate assembly 70 comprises: (i) a mounting plate 72 having at least one aperture 72A therein for accepting a print head nozzle 16N associated with each of the print heads 16, (ii) the registration plate 18 affixed to the mounting plate 72 and having at least one opening 18A formed therein for permitting the deposition of ink from each of the print head nozzles 16N, the opening 18A having a width dimension $W_T$ orthogonal to the feed path of the conveyance system which is at least equal to the sum of the individual width dimensions $W_I$ associated with each of the print head nozzles 16N, and (iii) a plurality of runners 76 affixed to the mounting plate 72 and aligned with the feed path FP of the conveyance system, each runner 76 having a blade portion disposed at a location between adjacent print head nozzles 16N and operative to maintain a stand-off distance from a face surface of the mailpiece to one of the print head nozzles 16N.

More specifically, in FIGS. 9 and 10, the mounting plate 72 is affixed to a housing 78 which envelopes and supports the array of print heads 16. While the mounting plate 72 is depicted as a separate element mounted to and between side wall structures 78W of the housing 78, it will be appreciated that the mounting plate 72 may be integrated with the housing 78, i.e., function as a bottom wall or plate of the housing 78. Accordingly, in the context used herein, the mounting plate 72 is any structure which interposes the print heads 16 and the registration plate 18, and functions to mount other structure beneath the print heads 16 such as the registration plate 18.

The aperture 72A of the mounting plate 72 generally compliments the shape and position of the print head nozzles 16N, i.e., in the plane of the nozzles 16N. While individual apertures 72A may be formed or machined for each of the nozzles 16N, the mounting plate employs a single aperture 72A which accepts all of the nozzles 16N. Furthermore, the aperture 72A is stepped to accommodate the array of print head nozzles 16N which are staggered to provide print coverage over a large print zone. That is, as the mailpiece 14 moves under the array of print heads 16, each nozzle 16N thereof is available to print within a linear print zone, i.e., a zone equal to the width of a single print head nozzle 16N. Moreover, while the single aperture 72A essentially spans the entire length of the housing, i.e., in the direction of the mailpiece feed path FP, the width of the aperture 72A at any point along the length is only slightly larger than the width dimension $W_I$ of a single print head nozzle 16N. As a result, a region 80 of the mounting plate 72 is maintained for affixing other structure to the mounting plate 72.

While the registration plate 18 may be affixed directly to an underside surface 72U of the mounting plate 72, the registration plate 18 mounts to an spacer plate 82 which interposes an upper surface 18U of the registration plate 18 and the underside surface 72U of the mounting plate 72. Functionally, the spacer plate 82 is one of the elements employed to establish the stand-off distance between the print head nozzles 16N and the face surface 14S of the mailpiece 14. Furthermore, one or more additional spacer plates (not shown) may be substituted for, or disposed in combination with the spacer plate 82, to vary the stand-off distance between the print head nozzles 16N and the face surface 14S of each mailpiece 14. Occasionally, it may be necessary to vary the stand-off distance to process mailpieces having different physical properties or to accommodate the implementation of different print heads 16.

Finally, the spacer plate 82 includes an opening 82A which corresponds in shape to the opening 18A of the underlying registration plate 18. The characteristics of the registration plate opening 18A will be discussed in greater detail in the subsequent paragraph which characteristics are also applicable to the spacer plate opening 82.

Similar to the aperture 72A of the mounting plate, the opening 18A of the registration plate 18 is stepped to accommodate the staggered arrangement of the print head nozzles 16N. However, to prevent deposited ink from smearing or smudging, the opening 18A is open-ended. That is, the opening 18A is configured such that portions of the registration plate 18 downstream of each print head nozzle 16N are removed. As a consequence, the width dimension of the opening 72A increases incrementally downstream of the first print head nozzle 16NF, i.e., the initial print head nozzle available to deposit ink on a mailpiece 14. That is, the width dimension of the opening 72A increases by an amount equal to about the width of an individual print head nozzle 16N. Finally, the maximum width dimension $W_T$ of the opening 18A corresponds to the downstream end portion 18DE of the registration plate 18 and is generally equal to the sum of the width dimensions $W_1$ associated with each of the print head nozzles 16N.

While the opening 18A of the registration plate 18 has a stepped edge 18SE, it will be appreciated that other shapes may be employed. For example, to approximate the shape of the staggered print head array, the opening 18A may resemble a right triangle having a hypotenuse 84 which substitutes for the stepped edges 18SE of the opening 18A. Alternatively, the opening 18A may define a rectangle 86, though, it is generally believed that an opening which corresponds to the size and shape of the array of print nozzles 16 provides optimum characteristics, e.g., prevents the mailpiece 14 from catching on edges of the registration plate assembly 70 and provides optimum print quality.

Figure 11:
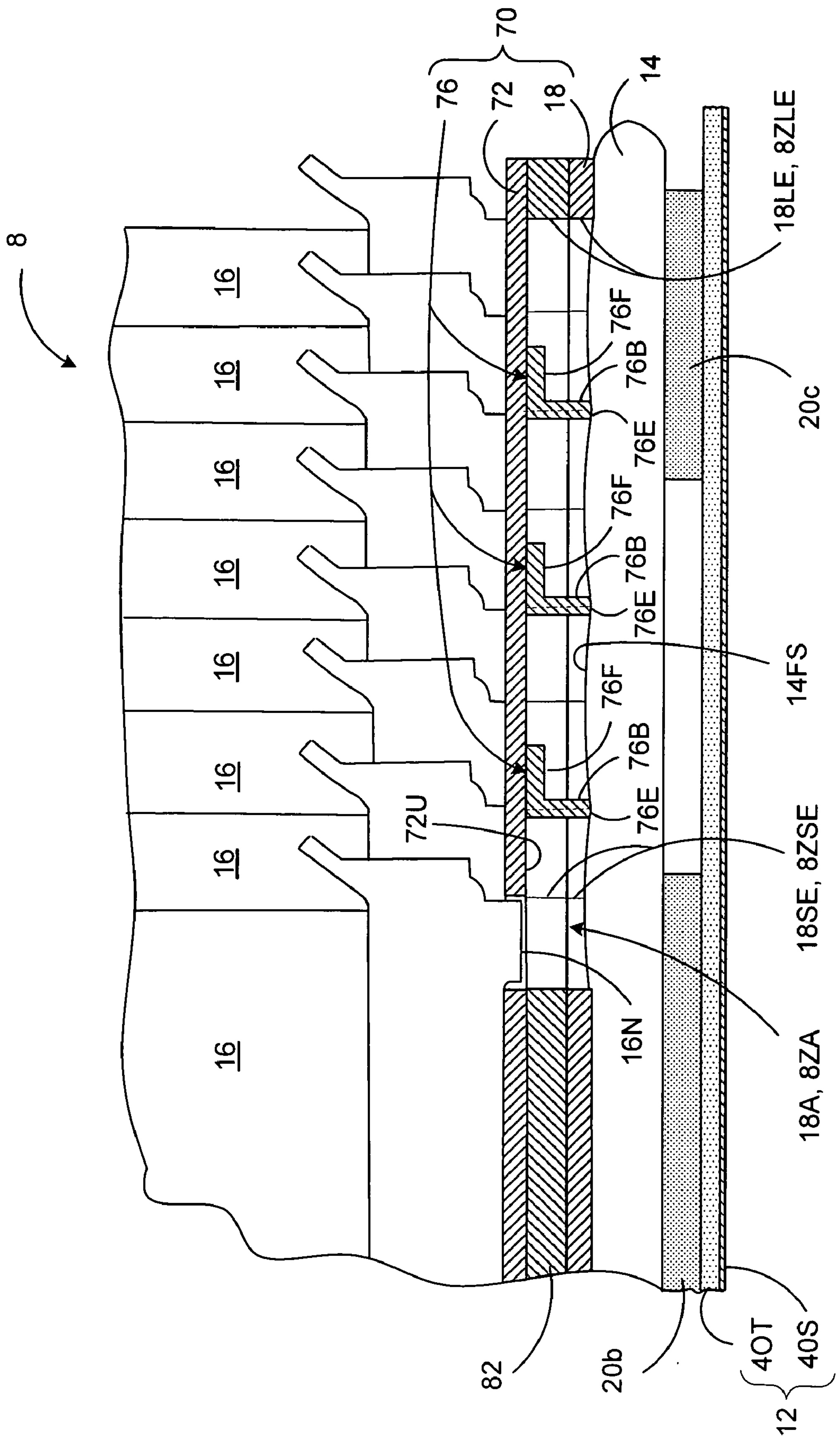
FIG. 11 is an enlarged sectional view taken substantially along line 11-11 of FIG. 10 depicting a mailpiece being processed beneath/by the print head assembly and the runners engaging the mailpiece to maintain a desired stand-off dimension between the print head assembly nozzles and the face surface of each mailpiece.

In FIGS. 9 and 11, the described embodiment of the registration plate assembly 70 includes three (3) runners 76 which define channels within the registration and spacer plate openings 18A, 82A. The runners 76 are aligned with, e.g., parallel to, the feed path FP of the conveyance system 10 and are spaced-apart evenly in a lateral direction, e.g., orthogonal to the feed path FP. Inasmuch as the length dimension L of the registration and spacer plate openings 18A, 82A vary due to the stepped edges 18SE, 82SE thereof, the length LR of each of the runners 76 may vary by a commensurate amount.

In FIGS. 10 and 11, each runner 76 has a generally L-shaped cross section and includes: (i) a blade portion 76B which projects downwardly from the mounting plate 72 and (ii) a flange portion 76F which lies in a plane parallel to the underside surface 72U of the mounting plate 72 The blade portion 76B has a leading edge which is curved and defines a blade edge 76E which slideably engages the face surface 14S of each mailpiece 14. The flange portion 76F includes a plurality of slotted apertures 76A (see FIG. 10) which accept a fastener 88 (see FIG. 11) for affixing the runner 76 to the mounting plate 72. The apertures 76A permit a small degree of lateral adjustment such that the blade portion 76B of each runner 76 may be accurately positioned within the registration and spacer plate openings 18A, 82A. Generally, the blade portion 76B of each runner 76 is aligned with one of the steps 18SE, 82SE of the registration and spacer plate openings 18A, 82A. Furthermore, the forward end 76FE (see FIG. 10) of each runner 76 is disposed aft, or downstream, of one of the steps 18SE, 82SE and/or is longitudinally aligned with a riser edge 18RE, 82RE disposed downstream of the respective step 18SE, 82SE. As such, each runner 76 does not interfere with ink deposited from the print head nozzle 16N disposed upstream of the respective runner 76, i.e., the nozzle corresponding to the respective step 18SE, 82SE.

In operation, the registration plate assembly 70 provides the necessary stand-off distance from the print head nozzles 16N to the face surface 14FS of the underlying mailpiece 14. The compliant conveyance system 10 transports the mailpieces 14 to the print head assembly 8 and, as the mailpieces 14 approach the array of print heads 16, an inclined leading edge 181E of the registration plate 18 guides each mailpiece 14 beneath the registration plate 18, The inclined edge 181E defines an angle θ of between about ten (10) degrees to about forty (40) degrees relative to the plane of the compliant deck 12 to ensure that both thin and thick mailpieces 14TN, 14TK are accepted/ingested smoothly beneath the plate 79 and in register with the contact surface 18S. As the mailpieces 14 engage the registration plate assembly 70, the print head assembly 8 presses downwardly on the face surface 14FS of the mailpiece 14 during processing/printing. Any tendency for the mailpiece 14, i.e., the face surface 14FS, to bow upwardly toward the print head nozzles is mitigated by the runners 76. More specifically, the face surface 14FS is vertically supported by the runners 76 at locations between the stepped and opposing lateral edges 18SE, 82SE, 18LE, 82LE of the registration and spacer plate openings 18A, 82A. Inasmuch as the blade portion 76B of each runner 76 is aligned with, and parallel to, one of the stepped edges 18SE, 82SE, the blade edge 76E does not smear or smudge ink deposited by an upstream nozzle 16N. The blade edge 76E contacts the face surface 14FS at a position between nozzles 16N and does not interfere with the deposited ink, i.e., ink deposited in linear zones to each side of a runner 76. Such zones may correspond to the white space between printed lines of a destination or return address.

Pivotable Support/Instrumentation Rack for Print Head Assembly

Figure 12:
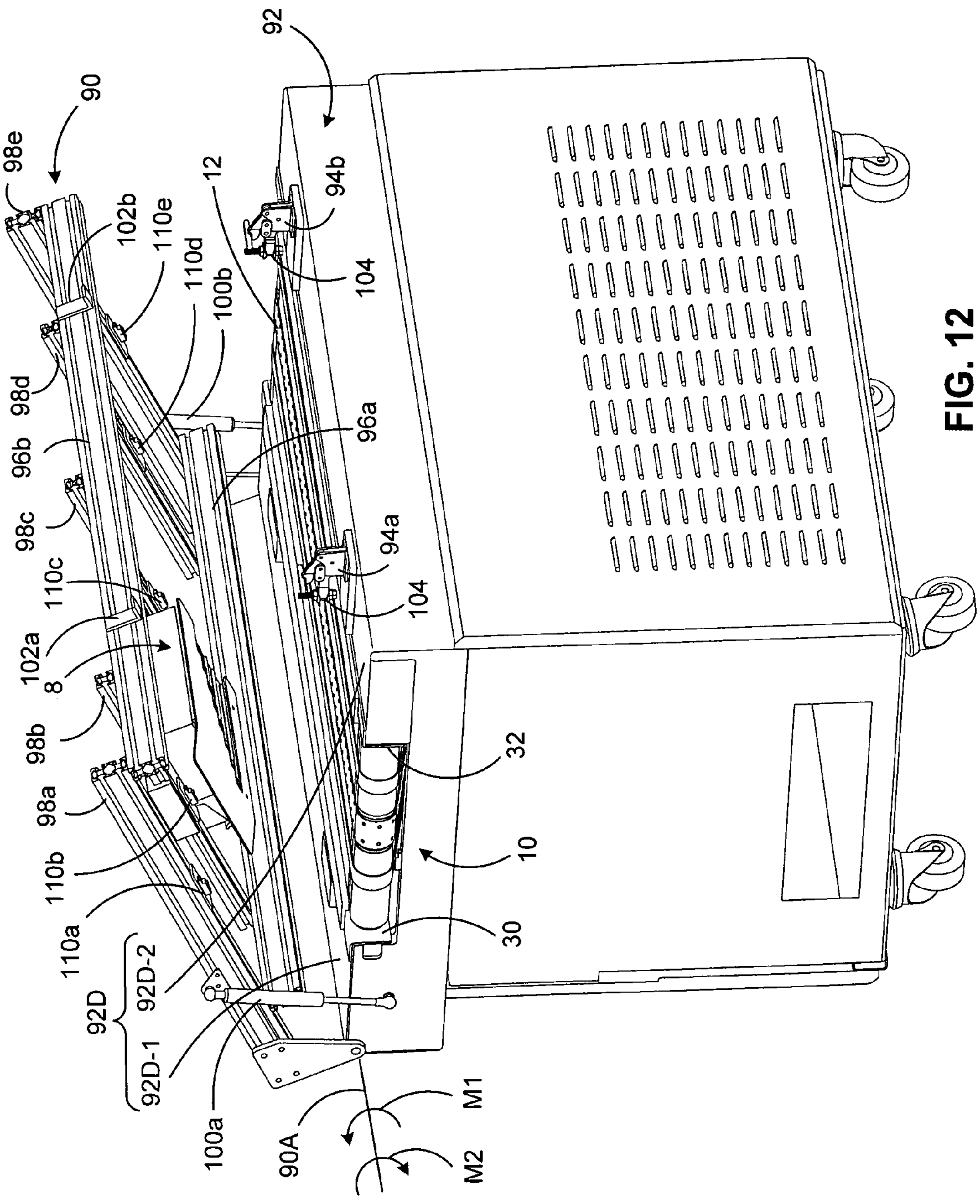
FIG. 12 depicts a perspective view of a pivotable support/instrumentation rack operative to support the print head assembly with respect to the underlying compliant conveyance system and mount a variety of instrumentation, e.g., photocells/position sensors, for monitoring the progress and condition of mailpieces being processed.
Figure 13:
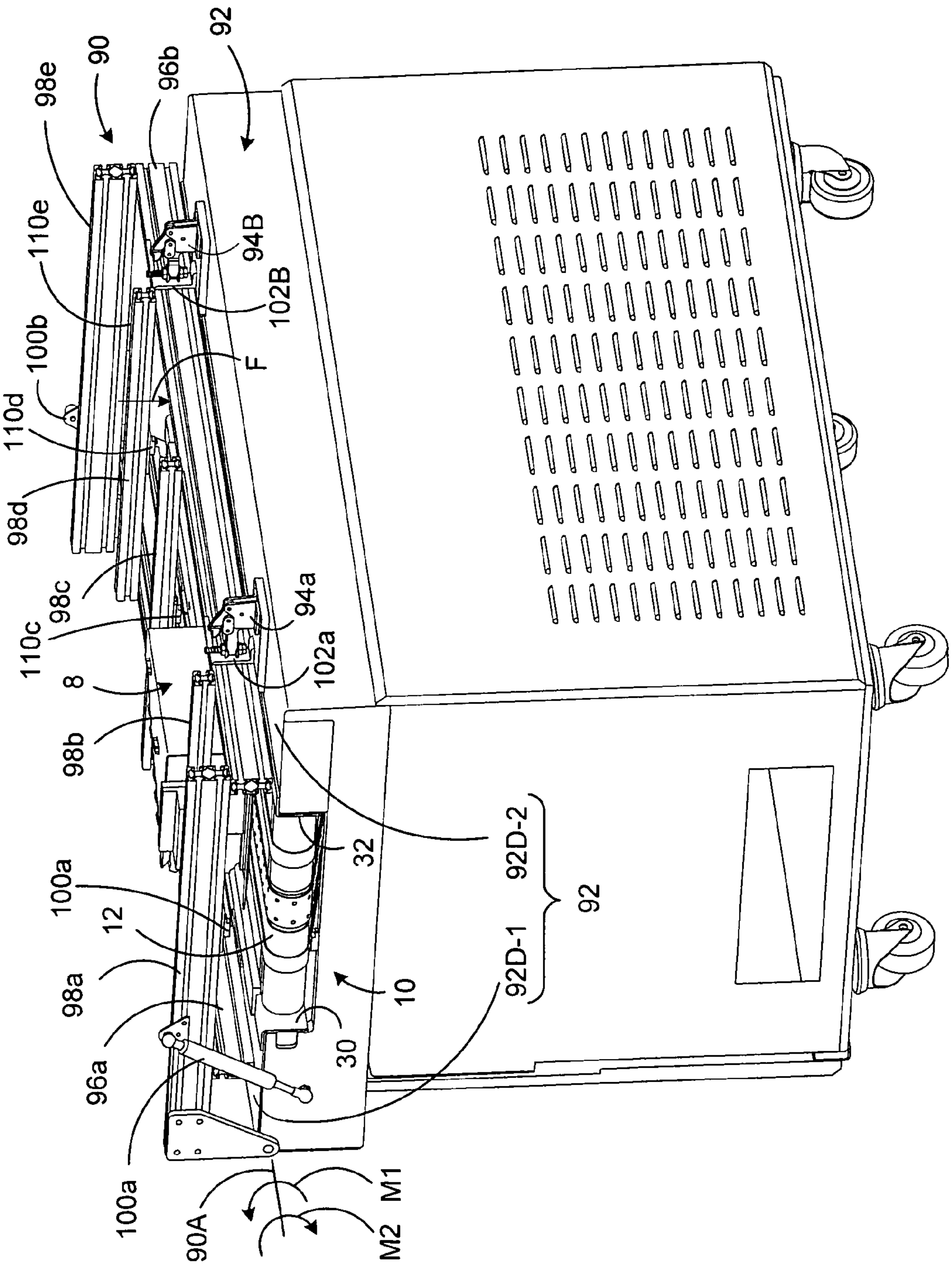
FIG. 13 depicts the support/instrumentation rack pivoted to a closed position and secured by a pair of locking mechanisms to the top deck of a housing structure.

In FIGS. 12 and 13, the print head assembly 8 is affixed to a pivotable support/instrumentation rack 90 to perform routine maintenance on the print head assembly 8 and underlying compliant conveyance system 10. More specifically, the compliant conveyance system 10 is disposed in combination with a housing 92 which mounts the pivotable support/instrumentation rack 90. The housing 92 accepts the conveyance system 10 such that the compliant deck 12 is essentially co-planar with a top deck 92D of the housing 92. The top deck 92D includes first and second portions 92D-1, 92D-2 which extend outwardly from the side beam members 30, 32 of the conveyance system 10. The first portion 92D-1 of the deck 92D pivotally mounts the support/instrumentation rack 90 about an axis 90A while the second portion 92D-2 of the top deck 92D mounts a pair of locking mechanisms 94*a*, 94*b*.

The support/instrumentation rack 90, furthermore, includes a pair of structural longerons 96*a*, 96*b* disposed parallel to the feed path of the conveyance system 10 and a plurality of stiffening ribs 98*a*, 98*b*, 98*c*, 98*d*, 98*e* which structurally interconnect the longerons 96*a*, 96*b* in a lateral direction. A pair of gas springs 100*a*, 100*b* is interposed between the housing 92 and a pair of the stiffening ribs 98*a*, 98*e*, to rotate the support instrumentation rack 90 about the pivot axis 90A. More specifically, the gas springs 100*a*, 100*b* impose a counterclockwise moment M1 about the axis 90A to bias the support/instrumentation rack 90 upwardly, i.e., to an open position. Furthermore, the support/instrumentation rack 90 may be moved to a closed position by imposing a clockwise moment M2 about the axis 90A (i.e., a vertically downward force F applied by an operator). The closed position is achieved when a pair of high tolerance feet 102*a*, 102*b*, mounted to the outboard longeron 96*b*, abut each of the locking mechanisms 94*a*, 94*b*. An anvil portion 104 of each of the locking mechanisms 94*a*, 94*b* rotates to engage an upper surface of the feet 102*a*, 102*b*, thereby locking the position of the support/instrumentation rack 90 against the upward biasing force of the gas springs 100*a*, 100*b*.

The print head assembly 8 is mounted to one of the stiffening ribs 98*a*, 98*b*, 98*c*, 98*d*, 98*e* and positioned therealong such that, when the support/instrumentation rack 90 is closed, the print head and registration plate assemblies are precisely located, i.e., in a vertical direction, with respect to the underlying conveyance system 10. In addition to mounting the print head assembly 8, the stiffening ribs 98*a*, 98*b*, 98*c*, 98*d*, 98*e* may also locate and support a variety of instrumentation such as a plurality of photocells 110*a*, 110*b*, 110*c*, 110*d*, 110*e*. These photocells 110*a*, 110*b*, 110*c*, 110*d*, 110*e* may be used to locate the position of each mailpiece 14 as mailpieces 14 are conveyed along the compliant deck 12. Sensors (not shown) disposed beneath the deck 12 receive a beam of light through apertures 112 (shown in FIGS. 1, 2 and 4) in the compliant deck 12.

The pivotable support/instrumentation deck 90 facilitates access to the print head assembly 8 and underlying compliant conveyance system 10. When the locking assemblies 102*a*, 102*b* are released, the support/instrumentation deck 90 immediately rotates to the open position under the force of the gas springs 100*a*, 100*b*. The print heads 16 may be repaired and replaced as required while the photocells 110*a*, 110*b*, 110*c*, 110*d*, 110*e* may be inspected and cleaned, i.e., of paper dust debris.

It is to be understood that all of the present figures, and the accompanying narrative discussions of preferred embodiments, do not purport to be completely rigorous treatments of the methods and systems under consideration. For example, while the invention describes an interval of time for completing a phase of sorting operations, it should be appreciated that the processing time may differ. A person skilled in the art will understand that the steps of the present application represent general cause-and-effect relationships that do not exclude intermediate interactions of various types, and will further understand that the various structures and mechanisms described in this application can be implemented by a variety of different combinations of hardware and software, methods of escorting and storing individual mailpieces and in various configurations which need not be further elaborated herein.

What is claimed is:

1. A vacuum conveyance/manifold system for processing mailpieces, comprising:

at least one conveyor belt rotating around a plurality of drive rollers, the conveyor belt having rows of aligned apertures disposed therein and a drive surface for engaging a face surface of each of the mailpieces for conveyance along the feed path, a compliant deck disposed beneath and supporting an underside surface of the at least one conveyor belt, the compliant deck, furthermore, defining a neutral axis in bending and having a high elongation, low modulus material in a portion of the deck which is distal from the bending neutral axis, and a high yield strength, high modulus material in a portion of the deck which lies coincident with the bending neutral axis, the compliant deck, furthermore, having a plurality of elongate slots formed in the high elongation, low modulus material, the elongate slots being aligned, and in fluid communication, with the rows of apertures disposed in the at least one conveyor belt, a vacuum source, and a flexible manifold system having a plurality of flexible tubes in fluid communication with the elongate slots of the compliant deck and the vacuum source for developing a pressure differential across each of the mailpieces when in contact with the drive surface.

2. The vacuum conveyance/manifold system according to claim 1 wherein the high elongation, low modulus material is Poly-Tetra-Flora-Ethylene (PFTE).

3. The vacuum conveyance/manifold system according to claim 1 wherein the high yield strength, high modulus material is spring steel.

4. The vacuum conveyance/manifold system according to claim 1 wherein the high elongation, low modulus material is Poly-Tetra-Flora-Ethylene (PFTE) and wherein the high yield strength, high modulus material is spring steel.

5. The vacuum conveyance/manifold system according to claim 1 wherein the compliant deck has a plurality of circular apertures in the high yield strength, high modulus material, and wherein the circular apertures are in fluid communication with the elongate slots.

6. The vacuum conveyance/manifold system according to claim 1 wherein the compliant deck comprises a multiple layers defining a mating interface therebetween, the interface permitting relative motion between the layers as the compliant deck flexes under load.

7. The vacuum conveyance/manifold system according to claim 5 wherein the compliant deck comprises a multiple layers defining a mating interface therebetween, and wherein the mating interface forms a seal between the layers in response to a pressure differential between the layers produced by the vacuum source.

8. The vacuum conveyance/manifold system according to claim 1 wherein the compliant deck includes a support layer and a surface layer, the support layer being fabricated from the high yield strength, high modulus material and the surface layer being fabricated from the high elongation, low modulus material, wherein the elongate slots are disposed in the surface layer, wherein a plurality of circular apertures are formed in the support layer and are in fluid communication with the elongate apertures, and wherein the flexible tubing is in fluid communication with the circular apertures of the support layer.

9. The vacuum conveyance/manifold system according to claim 8 wherein the high yield strength, high modulus material is spring steel.

10. The vacuum conveyance/manifold system according to claim 8 wherein the high elongation, low modulus material is Poly-Tetra-Flora-Ethylene (PFTE) and wherein the high yield strength, high modulus material is spring steel.

11. The vacuum conveyance/manifold system according to claim 10 wherein the compliant deck has a plurality of circular apertures in the high yield strength, high modulus material, and wherein the circular apertures are in fluid communication with the elongate slots.

12. A method for conveying mailpieces along a feed path comprising the steps of:

placing a face surface of each mailpiece on at least one conveyor belt driven around a plurality of drive rollers, the conveyor belt defining rows of aligned apertures and having a drive surface for receiving each of the mailpieces, providing a compliant deck disposed beneath and supporting an underside surface of the at least one conveyor belt, the compliant deck, furthermore, defining a neutral axis in bending and having a high elongation, low modulus material in a portion of the deck which is distal from the bending neutral axis, and a high yield strength, high modulus material in a portion of the deck which lies coincident with the bending neutral axis, the compliant deck, furthermore, having a plurality of elongate slots formed in the high elongation, low modulus material, the elongate slots being aligned, and in fluid communication, with the rows of apertures disposed in the at least one conveyor belt, and developing a pressure differential across each of the mailpieces to urge the face surface thereof into frictional engagement with the drive surface of the at least one conveyor belt to drive the mailpieces along the feed path.

13. The method according to claim 12 wherein the high elongation, low modulus material is Poly-Tetra-Flora-Ethylene (PFTE).

14. The method according to claim 12 wherein the high yield strength, high modulus material is spring steel.

15. The method according to claim 12 wherein the high elongation, low modulus material is Poly-Tetra-Flora-Ethylene (PFTE) and wherein the high yield strength, high modulus material is spring steel.

16. The method according to claim 12 wherein the compliant deck has a plurality of circular apertures in the high yield strength, high modulus material, and wherein the circular apertures are in fluid communication with the elongate slots.

17. The method according to claim 12 wherein the compliant deck comprises a multiple layers defining a mating interface therebetween, the interface permitting relative motion between the layers as the compliant deck flexes under load.

18. The method according to claim 16 wherein the compliant deck comprises a multiple layers defining a mating interface therebetween, and wherein the mating interface forms a seal between the layers in response to a pressure differential between the layers produced by the vacuum source.

* * * * *